(12) United States Patent
Hirosawa

(10) Patent No.: US 9,013,663 B2
(45) Date of Patent: Apr. 21, 2015

(54) LIQUID CRYSTAL DISPLAY DEVICE

(71) Applicant: Japan Display Inc., Minato-ku (JP)

(72) Inventor: Jin Hirosawa, Saitama-ken (JP)

(73) Assignee: Japan Display, Inc., Minato-ku (JP)

( * ) Notice: Subject to any disclaimer, the term of this patent is extended or adjusted under 35 U.S.C. 154(b) by 0 days.

(21) Appl. No.: 14/323,643

(22) Filed: Jul. 3, 2014

(65) Prior Publication Data

US 2014/0320793 A1    Oct. 30, 2014

Related U.S. Application Data

(62) Division of application No. 14/186,843, filed on Feb. 21, 2014, now Pat. No. 8,830,435, which is a division of application No. 13/549,013, filed on Jul. 13, 2012, now Pat. No. 8,692,947.

(30) Foreign Application Priority Data

Sep. 16, 2011   (JP) ................. 2011-203773

(51) Int. Cl.
*G02F 1/136* (2006.01)
*G02F 1/1343* (2006.01)
*G02F 1/1337* (2006.01)
*G02F 1/1362* (2006.01)

(52) U.S. Cl.
CPC ........ *G02F 1/134309* (2013.01); *G02F 1/1337* (2013.01); *G02F 1/134363* (2013.01); *G02F 1/136213* (2013.01); *G02F 2001/13629* (2013.01)

(58) Field of Classification Search
USPC ................................. 349/141–142
See application file for complete search history.

(56) References Cited

U.S. PATENT DOCUMENTS

| 6,266,116 | B1 | 7/2001 | Ohta et al. |
| 2001/0010575 | A1 | 8/2001 | Yoshida et al. |
| 2004/0165136 | A1 | 8/2004 | Sugiyama et al. |

(Continued)

FOREIGN PATENT DOCUMENTS

| JP | 6-222397 | 8/1994 |
| JP | 7-159807 | 6/1995 |

(Continued)

OTHER PUBLICATIONS

U.S. Appl. No. 14/261,761, filed Apr. 25, 2014, Morita, et al.

*Primary Examiner* — Phu Vu
(74) *Attorney, Agent, or Firm* — Oblon, McClelland, Maier & Neustadt, L.L.P.

(57) ABSTRACT

A liquid crystal display device includes a first substrate and a second substrate. The first substrate includes a gate line and an auxiliary capacitance line extending in a first direction, a source line extending in a second direction orthogonally crossing the first direction, and a pixel electrode having a main pixel electrode arranged on the auxiliary capacitance line and extending in the first direction. The second substrate includes a common electrode having a main common electrode arranged above the gate line and extending in the first direction. A liquid crystal layer is held between the first substrate and the second substrate having liquid crystal molecules. The liquid crystal molecules are initially aligned in the first direction in a splay alignment state between the first substrate and the second substrate in a state where electric field is not formed between the pixel electrode and the common electrode.

17 Claims, 10 Drawing Sheets

(56) References Cited

U.S. PATENT DOCUMENTS

| | | |
|---|---|---|
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |

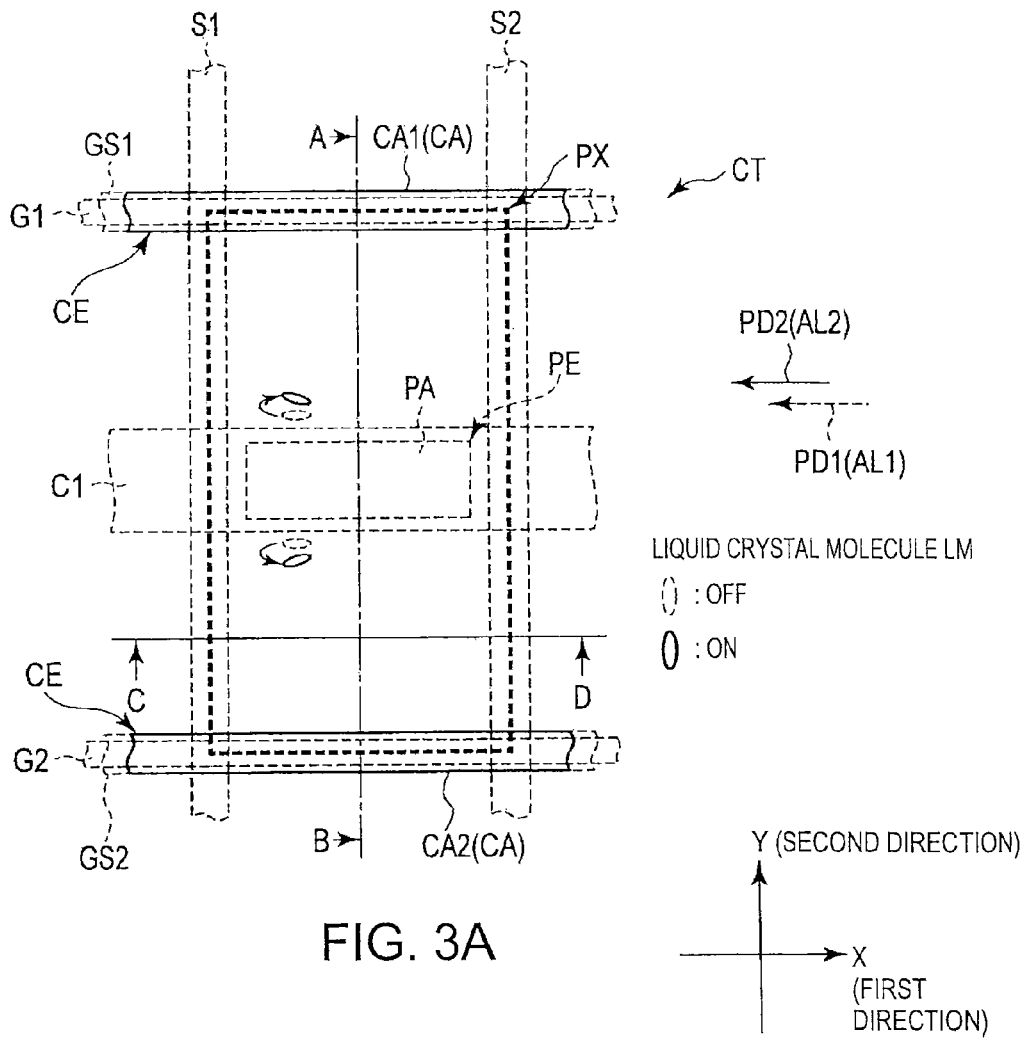
FIG. 3A
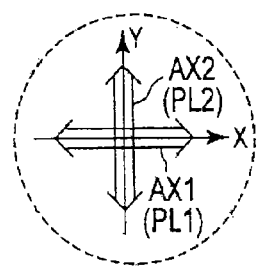
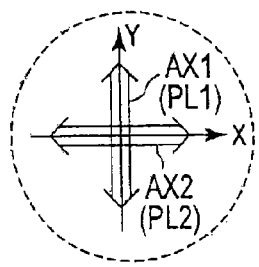
FIG. 3B  FIG. 3C

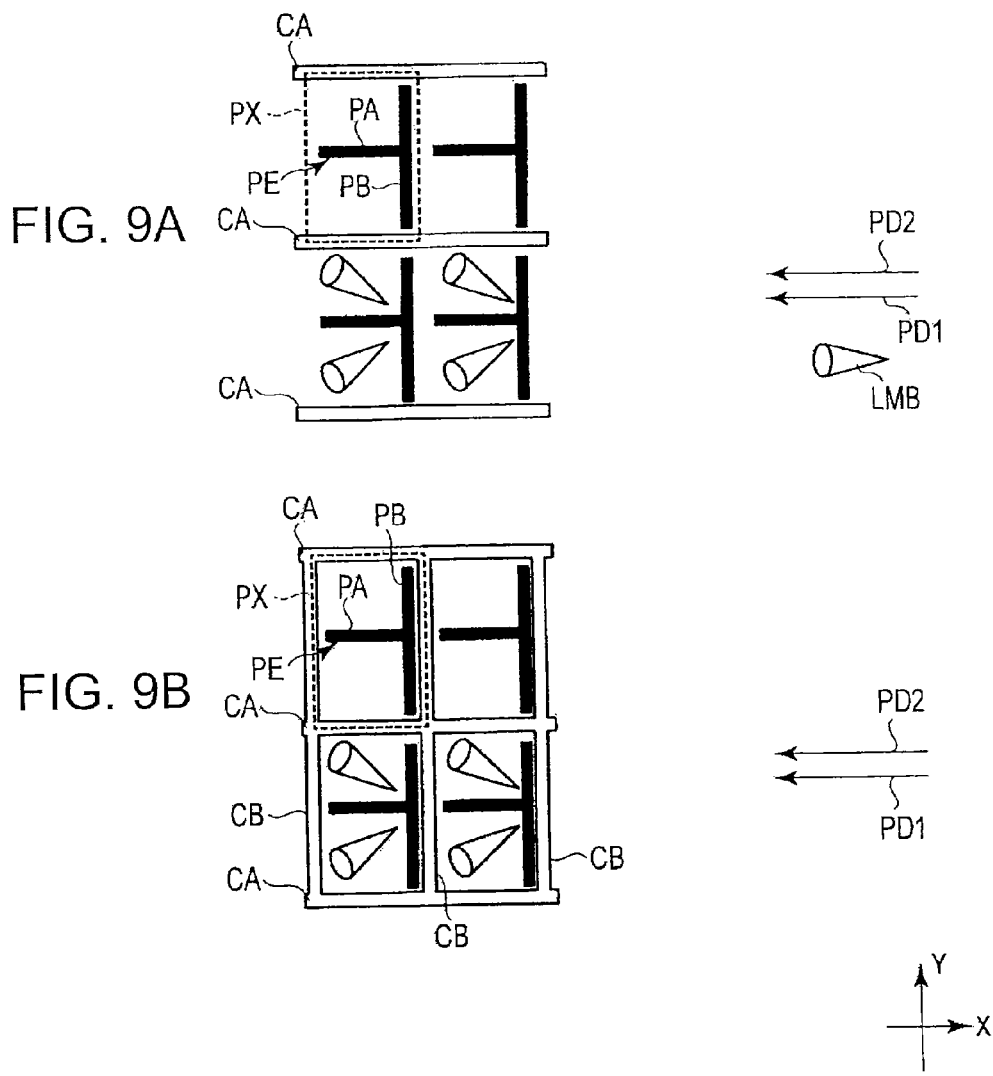

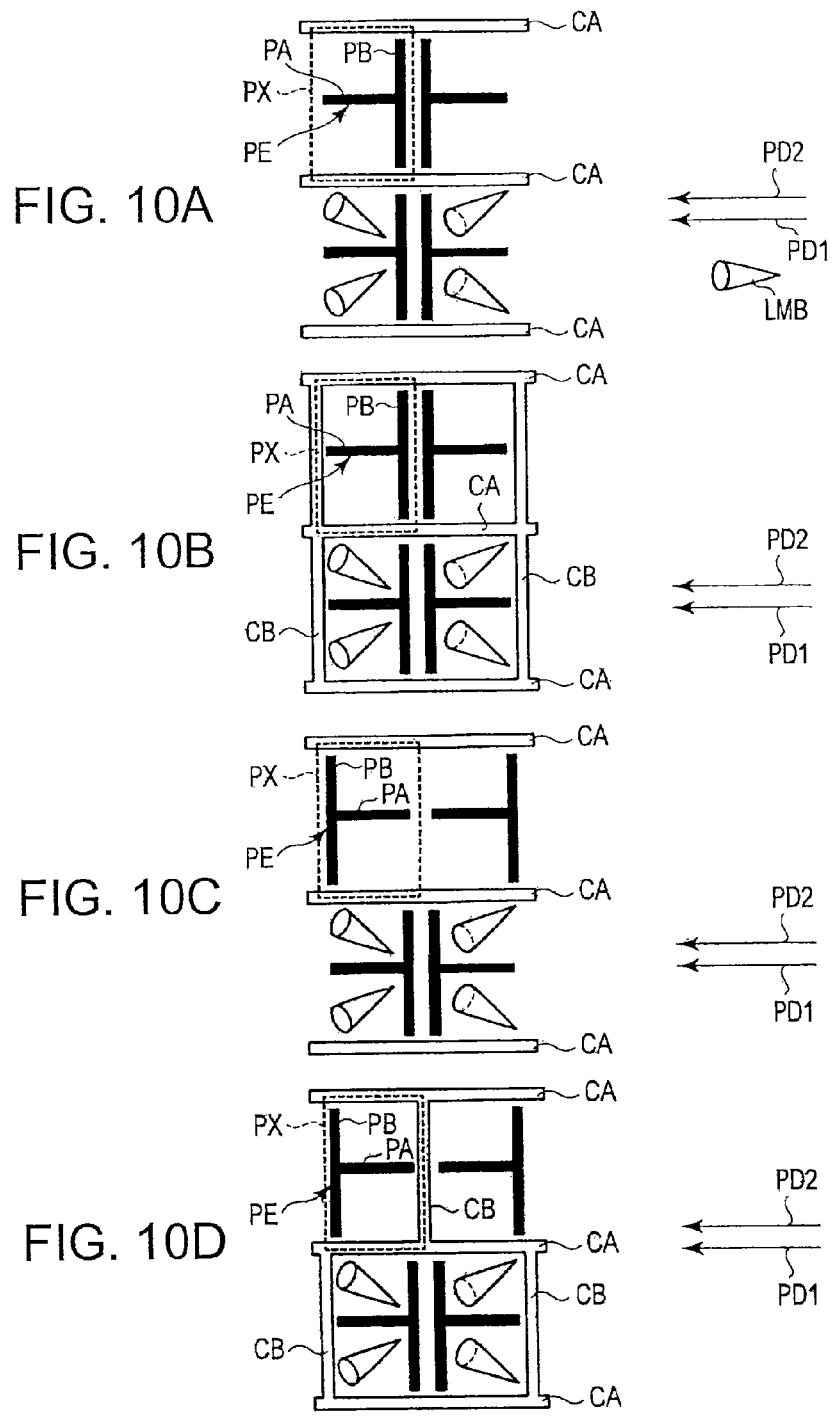

LIQUID CRYSTAL DISPLAY DEVICE

CROSS-REFERENCE TO RELATED APPLICATION

This application is a divisional of U.S. application Ser. No. 14/186,843 filed Feb. 21, 2014, which is a divisional of U.S. application Ser. No. 13/549,013 filed Jul. 13, 2012, and is based upon and claims the benefit of priority from prior Japanese Patent Application No. 2011-203773, filed Sep. 16, 2011, the entire contents of each of which are incorporated herein by reference.

FIELD

Embodiments described herein relate generally to a liquid crystal display device.

BACKGROUND

In recent years, a flat panel display is developed briskly. Especially, the liquid crystal display device gets a lot of attention from advantages, such as light weight, thin shape, and low power consumption. In an active matrix type liquid crystal display device equipped with a switching element in each pixel, a structure using lateral electric field, such as IPS (In-Plane Switching) mode and FFS (Fringe Field Switching) mode, attracts attention. The liquid crystal display device using the lateral electric field mode is equipped with pixel electrodes and a common electrode formed in an array substrate, respectively. Liquid crystal molecules are switched by the lateral electric field substantially in parallel with the principal surface of the array substrate.

On the other hand, another technique is also proposed, in which the liquid crystal molecules are switched using the lateral electric field or an oblique electric field between the pixel electrode formed in the array substrate and the common electrode formed in a counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

FIG. 3A is a plan view schematically showing the structure of one pixel in the counter substrate shown in FIG. 1.

FIGS. 3B and 3C show the relationship between a polarization axis and an initial alignment direction.

FIG. 7 is a figure schematically showing the alignment state of the liquid crystal molecules in the liquid crystal layer at the time of ON.

FIGS. 9A and 9B are figures showing variations of the pixel structures according to the embodiment.

FIGS. 10A, 10B, 10C and 10D are figures showing variations of the pixel structures according to the embodiment.

DETAILED DESCRIPTION

Figure 1:
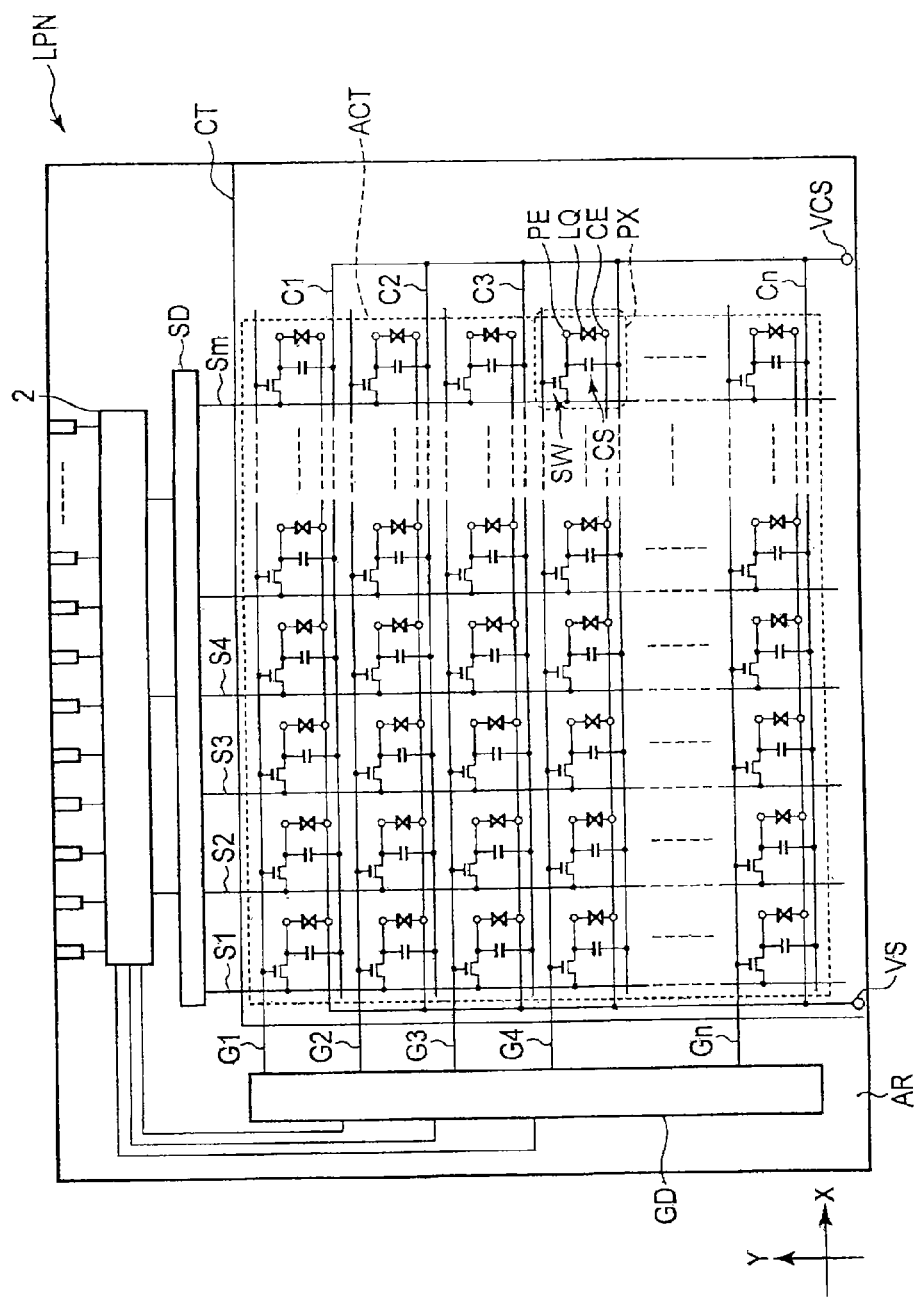
FIG. 1 is a figure schematically showing a structure and the equivalent circuit of a liquid crystal display device according to an embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including; a gate line and an auxiliary capacitance line extending in a first direction, a source line extending in a second direction orthogonally crossing the first direction, a switching element electrically connected with the gate line and the source line, a pixel electrode having a main pixel electrode arranged on the auxiliary capacitance line and extending in the first direction, the pixel electrode being connected with the switching element, and a first alignment film covering the pixel electrode, a second substrate including; a common electrode having a main common electrode arranged above the gate line and extending in the first direction, and a second alignment film covering the common electrode, a liquid crystal layer held between the first substrate and the second substrate having liquid crystal molecule, the liquid crystal molecule being initially aligned in the first direction and being aligned in a splay alignment state between the first substrate and the second substrate in a state where electric field is not formed between the pixel electrode and the common electrode.

FIG. 1 is a figure schematically showing the structure and the equivalent circuit of a liquid crystal display device according to the embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer held between the array substrate AR and the counter substrate CT. The liquid crystal display panel LPN includes an active area ACT which displays images. The active area ACT is constituted by a plurality of pixels PX arranged in the shape of a (m×n) matrix (here, "m" and "n" are positive integers).

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C correspond to signal lines extending in a first direction, respectively. The gate line G and the auxiliary capacitance line C are arranged in turns along a second direction Y that orthogonally intersects the first direction X. The source lines S cross the gate line G and the capacitance line C. The source lines S extend linearly in the second direction Y, respectively. The gate line G, the auxiliary capacitance line C and the source lines S do not necessarily extend linearly, and a portion thereof may be crooked partially.

Each gate line G is pulled out to outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example. The gate driver GD and the source driver SD are connected with the driver IC chip 2 provided in the array substrate AR and having an implemented controller.

Each pixel PX includes a switching element SW, a pixel electrode PE, a common electrode CE, etc. Retention capacitance Cs is formed, for example, between the auxiliary capacitance line C and the pixel electrode PE. The auxiliary capacitance line C is electrically connected with a voltage impressing portion VCS to which the auxiliary capacitance voltage is impressed.

In addition, in the liquid crystal display panel LPN according to this embodiment, while the pixel electrode PE is formed in the array substrate AR, at least one portion of the common electrode CE is formed in the counter substrate CT. Liquid crystal molecules of the liquid crystal layer LQ are switched mainly using an electric field formed between the pixel electrode PE and the common electrode CE. The electric field formed between the pixel electrode PE and the common electrode CE is a lateral electric field substantially in parallel with the principal surface of the array substrate AR or the principal surface of the counter substrate CT, or an oblique electric field slightly oblique with respect to the principle surfaces of the substrate.

The switching element SW is constituted by an n channel type thin film transistor (TFT), for example. The switching element SW is electrically connected with the gate line G and the source line S. The (m×n) switching elements SW are formed in an active area ACT. The switching element SW may be either a top-gate type or a bottom-gate type. Though the semiconductor layer is formed of poly-silicon, the semiconductor layer may be formed of amorphous silicon.

The pixel electrode PE is arranged in each pixel and electrically connected with the switching element SW. The common electrode CE is arranged in common to the pixel electrodes PE of a plurality of pixels through the liquid crystal layer LQ. Though the pixel electrode PE and the common electrode CE are formed by light transmissive conductive materials, such as Indium Tin Oxide (ITO), Indium Zinc Oxide (IZO), etc., other metals such as aluminum may be used.

The array substrate AR includes an electric power supply portion VS formed outside of the active area ACT to impress a voltage to the common electrode CE. Furthermore, the common electrode CE is drawn to outside of the active area ACT and electrically connected with an electric power supply portion VS formed in the array substrate AR through an electric conductive component which is not illustrated.

Figure 2:
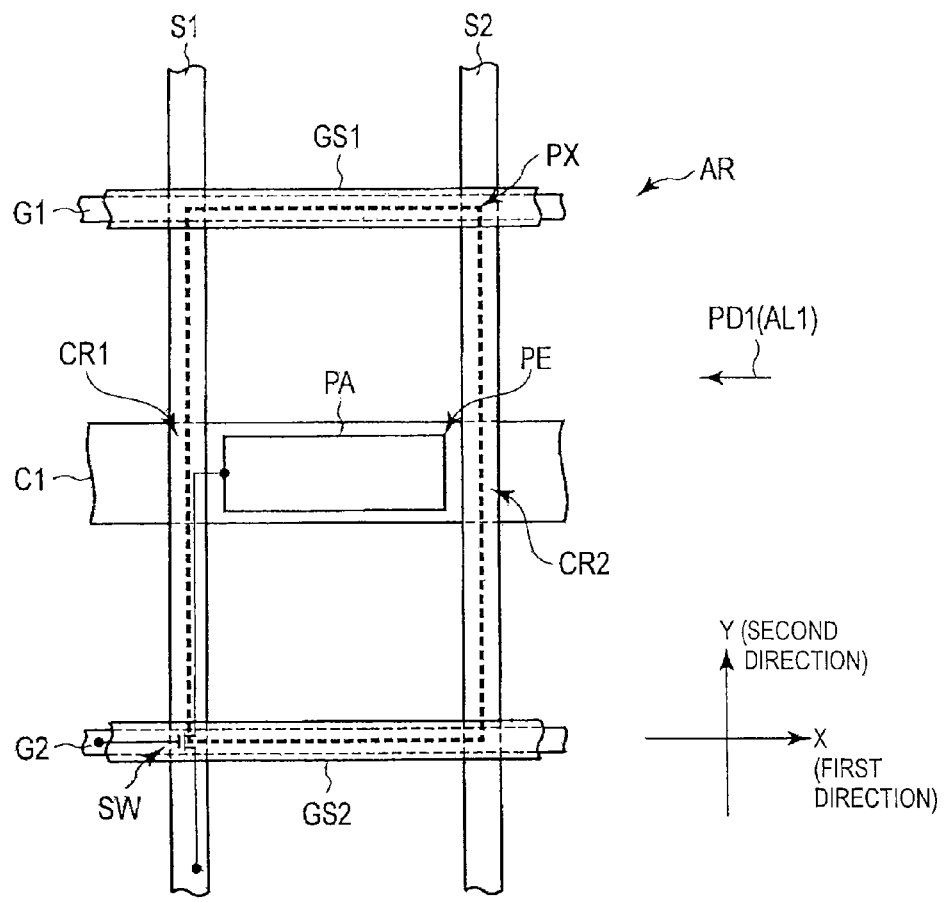
FIG. 2 is a plan view schematically showing a structure when an array substrate shown in FIG. 1 is seen from a counter substrate side according to the embodiment.

FIG. 2 is a plan view schematically showing the structure of one pixel when the array substrate AR according to the embodiment is seen from the counter substrate side. Herein, a plan view in a X-Y plane is shown.

The array substrate AR is equipped a gate line G1, a gate line G2, an auxiliary capacitance line C1, a source line S1, a source line S2, a switching element SW, a pixel electrode PE, and a first alignment film AL1, etc. In the illustrated example, the array substrate AR is further equipped with a gate shield electrode GS.

In FIG. 2, the pixel PX has the shape of a rectangle whose length in the first direction X is shorter than the length in the second direction Y, as shown in a dashed line. The pixel includes a pair of short ends located on the gate line G1 and the gate line G2 and a pair of long ends located on the source line S1 and the source line S2. The gate line G1 and the line G2 are arranged along the second direction Y with a first pitch and extend along the first direction X, respectively. The auxiliary capacitance line is arranged between the gate line G1 and the gate line G2 and extends in the first direction X. The source line S1 and the source line S2 are arranged with a second pitch in the first direction X and extend along the second direction Y, respectively.

In the illustrated example, the source line S1 is arranged at the left-hand side end in the pixel PX. Precisely, the source line S1 is arranged striding over a boundary between the illustrated pixel and a pixel PX adjoining the illustrated pixel PX on the left-hand side. The source line S2 is arranged at the right-hand side end. Precisely, the source line S2 is arranged striding over a boundary between the illustrated pixel and a pixel PX adjoining the illustrated pixel PX on the right-hand side. The length of the pixel along the first direction X corresponds to the second pitch between the source lines.

Moreover, in the pixel PX, the gate line G1 is arranged at an upper end portion. Precisely, the gate line G1 is arranged striding over a boundary between the illustrated pixel and a pixel which adjoins the illustrated pixel PX on its upper end side. The gate line G2 is arranged at a lower end portion. Precisely, the gate line G2 is arranged striding over a boundary between the illustrated pixel and a pixel adjoining the illustrated pixel PX on its lower end side. That is, the length along the second direction Y corresponds to the first pitch between the gate lines. The first pitch is larger than the second pitch.

Moreover, in the illustrated pixel PX, the auxiliary capacitance line C1 is arranged in the center of the pixel, i.e., substantially in the center between the gate line G1 and the gate line G2. The distance between the auxiliary capacitance line C1 and the gate line G1 in the second direction Y is same as that that between the auxiliary capacitance line C1 and the gate line G2 in the second direction Y.

The switching element SW is electrically connected with the gate line G2 and the source line S1 in the illustrated example. Namely, the switching element SW is formed in an intersection of the gate line G2 with the source line S1. A gate electrode of the switching transistor SW is connected with the gate line G2, and a source electrode WS is connected with the source line S1. A drain electrode connected with a drain line extending along the source line S1 and the auxiliary capacitance line C1 is electrically connected with the pixel electrode PE in a region which overlaps with the auxiliary capacitance line C1. The switching element SW is formed in the overlapped region with the source line S1 and the auxiliary capacitance line C1, and hardly runs off the overlapped region. Thereby, reduction of the area of an aperture portion which contributes to a display is suppressed when the switching element SW is arranged in the pixel PX.

The pixel electrode PE is located between the gate line G1 and the gate line G2 while it is located between the adjoining source line S1 and the source line S2. That is, the pixel electrode PE is located in the inner side surrounded by the source line S1 and the source line S2, and the gate line G1 and the gate line G2.

The pixel electrode PE is equipped with a main pixel electrode PA located on the auxiliary capacitance line C1. The main pixel electrode PA is located between a first intersection portion CR1 in which the source line S1 and the auxiliary capacitance line C1 intersect and a second intersection portion CR2 in which the source line S2 and the auxiliary capacitance line C1 intersect, and linearly extends between the first intersection portion CR1 and the second intersection part CR2 along the first direction X. The main pixel electrode PA is formed in the shape of a belt with the substantially same width along the second direction Y. The length of the pixel electrode PA in the first direction is shorter than the second pitch between the source lines.

The pixel electrode PE is arranged between the gate line G1 and the gate line G2. The gate line G1 and the gate line G2 are located on the both sides which sandwich the pixel electrode PE. In the illustrated example, the pixel electrode PE is arranged substantially in a center portion between the gate line G1 and the gate line G2, i.e., the center of the pixel PX. For this reason, the distance between the gate line G1 and the main pixel electrode PA in the first direction Y is substantially the same as that between the gate line G2 and the main pixel electrode PA in the second direction Y.

The gate shield electrodes GS counter with the gate line G in the X-Y plane, respectively, and linearly extend along the first direction X in parallel with an extending direction of the first pixel electrode PA. The gate shield electrode GS is formed in the shape of a belt with substantially the same width along the second direction Y.

In the illustrated example, the pair of the gate shield electrodes GS is arranged in parallel with a predetermined distance therebetween in the second direction Y, and arranged in the upper-and-lower both ends of the pixel PX, respectively. Hereinafter, in order to distinguish the pair of gate shield electrodes GS, the gate shield electrode on the upper side in the figure is called GS1, and the gate shield electrode GS on the lower side in the figure is called GS2. The gate shield electrode GS1 counters with the gate line G1. The gate shield electrode GS2 counters with the gate line G2.

In the pixel PX, the gate shield electrode GS1 is arranged at the upper end portion, and the gate shield electrode GS2 is arranged at the lower end portion. Precisely, the gate shield electrode GS1 is arranged striding over a boundary between the illustrated pixel and an adjoining pixel PX on its upper side, and the gate shield electrode GS2 is arranged striding over a boundary between the illustrated pixel and an adjoining pixel PX on its lower side. That is, in the example shown here, the gate shield electrode GS arranged on the array substrate AR is formed in the shape of a stripe, and is electrically connected with the electric power supply portion VS, and becomes the same potential as the common electrode CE. For this reason, the gate shield electrode GS has a combined function with the common electrode CE which can form electric field with the pixel electrodes PE.

The following relations can be said if its attention is paid to the spatial relationship between the pixel electrode PE and the gate shield electrode GS.

In the X-Y plane, the pixel electrode PA and the gate shield electrode GS are arranged by turns along the second direction Y. The pixel electrode PA and the gate shield electrode GS are arranged substantially in parallel each other. At this time, none of the gate shield electrodes GS overlaps with the pixel electrode PE in the X-Y plane. One pixel electrode PE is located between the adjoining gate shield electrode GS1 and gate shield electrode GS2. That is, the gate shield electrode GS1 and the gate shield electrode GS2 are arranged on the both sides which sandwich the pixel electrode PA. For this reason, the gate shield electrode GS1, the first main pixel electrode PA, and the gate shield electrode GS2 are arranged along the second direction Y in this order.

The inter-electrode distance between the main pixel electrode PA and the gate shield electrode GS is substantially the same in the second direction Y. That is, the inter-electrode distance between the main pixel electrode PA and the gate shield electrode GS1 is substantially the same as that between the gate shield electrode GS2 and the main pixel electrode PA in the second direction Y.

In the array substrate AR, the pixel electrode PE and the gate shield electrode GS are covered with a first alignment film AL1. Alignment treatment (for example, rubbing processing or optical alignment processing) is made to the first alignment film AL1 along a first alignment direction PD1 to initially align the liquid crystal molecule of the liquid crystal layer LQ. The first alignment treatment direction PD1 is substantially in parallel with the first direction X in which the pixel electrode PA extends.

FIG. 3A is a plan view schematically showing the structure of the PX in the counter substrate CT shown in FIG. 1. Herein, the plan view in the X-Y plane is shown. In addition, only structures required for explanation are illustrated. The dashed line shows principal portions of the array substrate, such as the pixel electrode PE, the gate shield electrode GS, the source line S, the gate line G, and the auxiliary capacitance line C, etc.

The counter substrate CT is equipped with the main common electrode CA. For example, on the outside of active area, the main common electrode CA is electrically connected with electric supply portion VS and the gate shield electrode GS formed on the array substrate, and set to the same potential as the gate shield electrode GS.

The main common electrode CA linearly extends on both sides sandwiching the pixel electrode PA in parallel with the first direction X in which the pixel electrode PA extends in the X-Y plane. The main common electrode CA faces the gate shield electrode GS and extends along the first direction X in parallel with the direction in which the pixel electrode PA extends. While the main common electrodes CA are located above the gate line G, the main common electrodes CA are located on the pair of short ends of the pixel, respectively. The main common electrodes CA are formed with the substantially same width along the second direction Y In the illustrated example, the pair of main common electrodes CA is arranged in the first direction X in parallel, with a predetermined distance therebetween. That is, two main common electrodes CA in one pixel are arranged along the second direction Y with the same pitch. In the pixel, the main common electrode CA1 is arranged on the upper end portion, and the main common electrode CA2 is arranged on the lower end portion. Precisely, the main common electrode CA1 is arranged striding over a boundary between the illustrated pixel and an adjoining pixel on its upper-hand side. The main common electrode CA2 is arranged striding over a boundary between the illustrated pixel and an adjoining pixel on its lower-hand side. The main common electrode CA1 faces the gate shield electrode GS1, and is located above the gate line G1. The main common electrode CA2 faces the gate shield electrode GS2, and is located above the gate line G2.

The main common electrode CA1 and the main common electrode CA2 are located in the both sides which sandwich the main pixel electrode PA in the X-Y plane. That is, in the X-Y plane, the main common electrode CA and the main pixel electrode PA are located by turns along the second direction Y. In the illustrated example, the main common electrode CA1, the main pixel electrode PA, and the main common electrode CA2 are located with this order. In addition, the inter-electrode distance between the main pixel electrode PA and main common electrode CA1 in the second direction Y is substantially the same as that between the main common electrode CA2 and the main pixel electrode PA.

The common electrode CE is covered with a second alignment film AL2 in the counter substrate CT. Alignment treatment (for example, rubbing processing or optical alignment processing) is made to the second alignment film AL2 along a second alignment treatment direction PD2 to initially align the liquid crystal molecule of the liquid crystal layer LQ. The second alignment treatment direction PD2 is in parallel with and the same direction as the first alignment treatment direction PD1.

Figure 4:
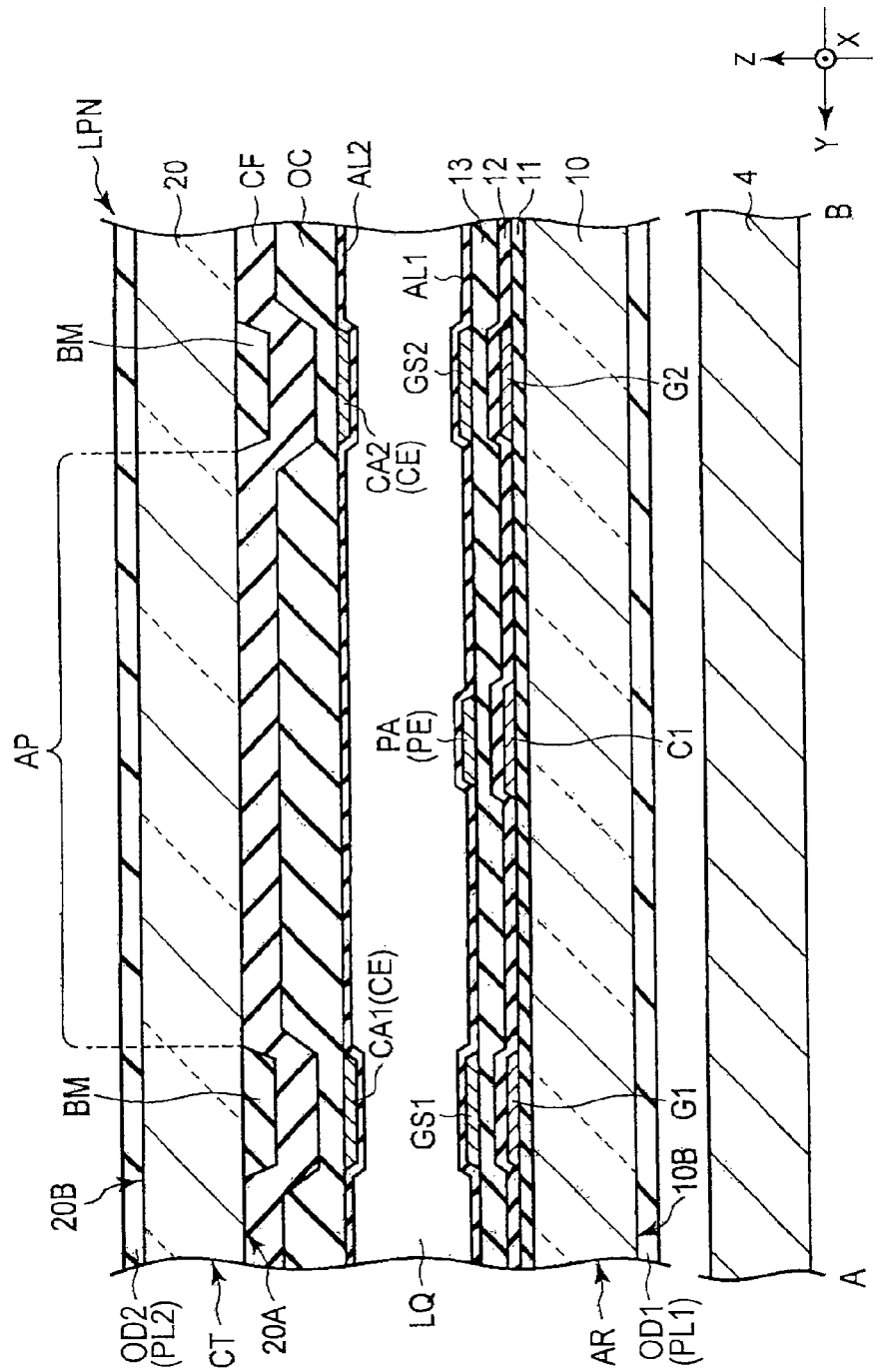
FIG. 4 is a cross-sectional view schematically showing the structure of the liquid crystal display panel taken along line A-B shown in FIG. 3A, seen from a source line S1 side.
Figure 5:
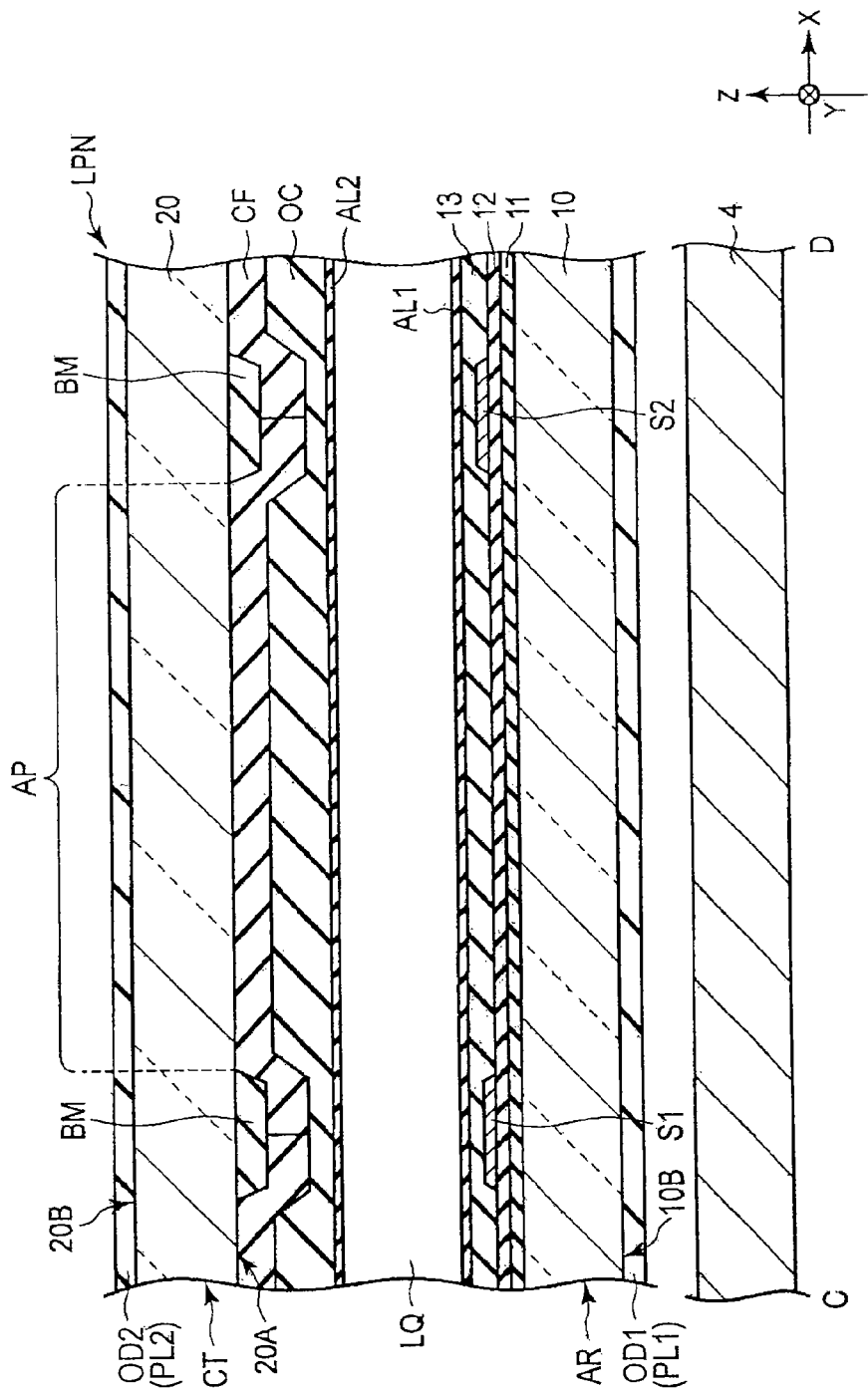
FIG. 5 is a cross-sectional view schematically showing the structure of the liquid crystal display panel taken along line C-D shown in FIG. 3A, seen from a gate line G2 side.

FIG. 4 is a cross-sectional view schematically showing a structure taken along line A-B in the liquid crystal display panel LPN shown in FIG. 3A, seen from the source line S1 side. FIG. 5 is a cross-sectional view schematically showing a structure taken along line C-D in the liquid crystal display panel LPN in FIG. 3A, seen from the gate line G2 side. In addition, only the required portions for explanation are illustrated here.

A backlight 4 is arranged on the back side of the array substrate AR in the illustrated example. Various types of backlights 4 can be used. For example, a light emitting diode (LED) or a cold cathode fluorescent lamp (CCFL), etc., can be applied as a light source of the backlight 4, and the explanation about its detailed structure is omitted.

The array substrate AR is formed using a first transmissive insulating substrate 10. The array substrate AR includes the gate line G1, the gate line G2, the auxiliary capacitance line C1, the source line S1, the source line S2, the pixel electrode PE, the gate shield electrode GS, a first insulating film 11, a second insulating film 12, a third insulating film 13, and the first alignment film AL1, etc., in the inner side of the first insulating substrate 10, i.e., on a surface facing the counter substrate CT.

The gate line G1, the gate line G2, and the auxiliary capacitance line C1 are formed on the first insulating film 11, and covered with the second insulating film 12. The source line S1 and the source line S2 are formed on the second insulating film 12, and covered with the third insulating film 13. That is, the second insulating film 12 corresponds to an interlayer insulating film between the gate lines G1, G2 and the source lines S1, S2.

The main pixel electrode PA of the pixel electrode PE, the gate shield electrode GS1, the gate shield electrode GS2, etc., are formed on the upper surface of the same insulating film, i.e., the upper surface of the third insulation film 13. The pixel electrode PE and the gate shield electrode GS can be formed by the same material.

The main pixel electrode PA is located in the inner side of the pixel PX rather than the position on the adjoining gate line G1 and the gate line G2. The gate shield electrode GS1 is located on the gate line G1. The gate shield electrode GS2 is located on the gate line G2. In addition, on the source line S1 and the source line S2, it is not necessary to arrange the electrodes (shield electrode, etc.) which have a function equivalent to the common electrode CE. This is because even if electric field leaks arise between the source line S and the pixel electrode PE, the leaked electric field is formed substantially in parallel with the first direction X which is the initial alignment direction of the liquid crystal molecule LM, therefore the leaked electric field does not give a bad influence on the display.

The first alignment film AL1 is arranged on the array substrate AR facing the counter substrate CT, and extends to whole active area ACT. The first alignment film AL1 covers the pixel electrode PE, etc., and is arranged also on the third interlayer insulating film 13. The first alignment film AL1 is formed of the material which shows a horizontal alignment characteristics.

The counter substrate CT is formed using a second insulating substrate 20 which has a transmissive characteristics. The counter substrate CT includes a black matrix BM, a color filter CF, an overcoat layer OC, a common electrode CE, and a second alignment film AL2, etc., in the internal surface of the second insulating substrate 20 facing the array substrate AR.

The black matrix BM is formed on the second insulating substrate 20 defining each pixel PX, and forms an aperture portion AP. That is, the black matrix BM is arranged so that line portions, i.e., the source line, the gate line, the auxiliary capacitance line, the switching element SW, may counter the black matrix BM. Herein, the black matrix BM includes a portion located above the source lines S1 and S2 extending along the second direction Y, and a portion located above the gate lines G1 and G2 extending along the first direction X, and is formed in the shape of a lattice. The black matrix BM is formed in an internal surface 20A of the second insulating substrate 20 facing the array substrate AR.

The color filter CF is arranged corresponding to each pixel PX. That is, while the color filter CF is arranged in the aperture portion AP in the internal surface 20A of the second insulating substrate 20, a portion thereof runs on the black matrix BM. The colors of the color filters CF arranged in adjoining pixels PX in the first direction X differ mutually. For example, the color filters CF are formed of resin materials colored by three primary colors of red, blue, and green, respectively. The red color filter CFR formed of resin material colored in red is arranged corresponding to the red pixel. The blue color filter CFB formed of resin material colored in blue is arranged corresponding to the blue pixel. The green color filter CFG formed of resin material colored in green is arranged corresponding to the green pixel. The boundary between the adjoining color filters CF is located in a position which overlaps with the black matrix BM.

The overcoat layer OC covers the color filter CF. The overcoat layer OC eases influence of concave-convex of the surface of the color filter CF.

The main common electrode CA1 and main common electrode CA2 of the common electrode CE, etc., are formed on the overcoat layer OC facing the array substrate AR, and located under the black matrix BM. The main common electrode CA1 is located above the gate shield electrode GS1. Moreover, the gate line G1 is located under the main common electrode CA1. The main common electrode CA2 is located above the gate shield electrode GS2. Moreover, the gate line G2 is located under the main common electrode CA2.

In the above-mentioned aperture portion AP, the region between the pixel electrode PE and the common electrodes CE, that is, between the pixel electrode PE and the main common electrodes CA1, and between the main pixel electrode PA and the main common electrodes CA2 corresponds to a transmissive regions in which the backlight can penetrate.

The second alignment film AL2 is arranged on the counter substrate CT facing the array substrate AR, and extends to whole active area ACT. The second alignment film AL2 covers the common electrode CE and the overcoat layer OC, etc. The second alignment film AL2 is formed of the materials having horizontal alignment characteristics.

The array substrate AR and the counter substrate CT as mentioned-above are arranged so that the first alignment film AL1 and the second alignment film AL2 face each other. In this case, a pillar-shaped spacer is formed integrally with one of the substrates by resin material between the first alignment film AL1 on the array substrate AR and the second alignment film AL2 on the counter substrate CT. Thereby, a predetermined gap, for example, a 2-7 μm cell gap, is formed. The array substrate AR and the counter substrate CT are pasted together by seal material which is not illustrated, in which the predetermined cell gap is formed, for example.

The liquid crystal layer LQ is held at the cell gap formed between the array substrate AR and the counter substrate CT, and is arranged between the first alignment film AL1 and the second alignment film AL2. The liquid crystal layer LQ contains liquid crystal molecules which are not illustrated. The liquid crystal layer LQ is constituted, for example, by positive type liquid crystal material.

Moreover, the distance between the main pixel electrode PA and the gate shield electrode GS in the second direction Y is larger than the thickness of the liquid crystal layer LQ, e.g., more than twice the thickness of the liquid crystal layer LQ.

A first optical element OD1 is attached on an external surface 10B of the array substrate AR, i.e., the external surface of the first insulating substrate 10 which constitutes the array substrate AR, by adhesives, etc. The first optical element OD1 is located on a side which counters with the backlight unit 4 of the liquid crystal display panel LPN, and controls the polarization state of the incident light which enters into the liquid crystal display panel LPN from the backlight unit 4. The first optical element OD1 includes a first polarizing plate PL1 having a first polarization axis (or first absorption axis) AX1. Other optical elements such as a retardation film may be arranged between the first polarizing plate PL1 and the first insulating substrate 10.

A second optical element OD2 is attached on an external surface 20B of the counter substrate CT, i.e., the external surface of the second insulating substrate 20 which constitutes the counter substrate CT, by adhesives, etc. The second optical element OD2 is located in a display surface side of the liquid crystal display panel LPN, and controls the polarization state of emitted light from the liquid crystal display panel LPN. The second optical element OD2 includes a second polarizing plate PL2 having a second polarization axis (or second absorption axis) AX2. Other optical elements such as a retardation film may be arranged between the second polarizing plate PL2 and the second insulating substrate 20.

The first polarization axis AX1 of the first polarizing plate PL1 and the second polarization axis AX2 of the second polarizing plate PL2 are arranged in the Cross Nicol state in which they substantially intersects perpendicularly. At this time, one polarizing plate is arranged, for example, so that its polarization axis is arranged substantially in parallel with or in orthogonal with the extending direction of the pixel electrode PA or the main common electrode CA. That is, when the extending directions of the main pixel electrode PA and the main common electrode CA are the first direction X, the absorption axes of one polarizing plate is substantially in parallel with the first direction X (crossing orthogonally with the second direction Y), or crosses orthogonally with the first direction X (in parallel with the second direction Y).

One polarizing plate is arranged, for example, so that the polarization axis is arranged in the initial alignment direction of the liquid crystal molecule, i.e., in orthogonal with or in parallel with the first alignment treatment direction PD1 or the second alignment treatment direction PD2. When the initial alignment direction is in parallel with the first direction X, the polarization axis of one polarizing plate is in parallel with the first direction X or the second direction Y.

In one example shown in FIG. 3B, the first polarizing plate PL1 is arranged so that the first polarization axis AX1 is in parallel with the extending direction of the main pixel electrode PA, i.e., the initial alignment direction (the first direction X) of the liquid crystal molecule LM. The first polarization axis AX1 is arranged in parallel with the first direction X. The second polarizing plate PL2 is arranged so that the second polarization axis AX2 orthogonally intersects with the extending direction of the main pixel electrode PA, i.e., the initial alignment direction of the liquid crystal molecule LM. The second polarization axis AX2 is arrange in parallel with the second direction Y.

In other example shown in FIG. 3C, the second polarizing plate PL2 is arranged so that the second polarization axis AX2 is arranged in parallel with the extending direction of the main pixel electrode PA, i.e., the initial alignment direction of the liquid crystal molecule LM. The second polarization axis AX2 is arranged in parallel with the first direction X. The first polarizing plate PL1 is arranged so that the first polarization axis AX1 orthogonally crosses with the extending direction of the main pixel electrode PA, i.e., the initial alignment direction of the liquid crystal molecule LM. The first polarization axis AX1 is arrange in parallel with the second direction Y.

Next, an operation of the liquid crystal display panel LPN of the above-mentioned structure is explained.

At the time of non-electric field state (OFF), i.e., when a potential difference (i.e., electric field) is not formed between the pixel electrode PE and the common electrode CE, the liquid crystal molecules LM of the liquid crystal layer LQ are aligned so that their long axis are aligned in the first alignment treatment direction PD1 of the first alignment film AL1 and the second alignment treatment direction PD2 of the second alignment film AL2. In this state, the time of OFF corresponds to the initial alignment state, and the alignment direction of the liquid crystal molecule LM corresponds to the initial alignment direction.

In addition, precisely, the liquid crystal molecules LM are not exclusively aligned in parallel with the X-Y plane, but are pre-tilted in many cases. For this reason, the precise direction of the initial alignment is a direction in which an orthogonal projection of the alignment direction of the liquid crystal molecule LM is carried out to the X-Y plane at the time of OFF.

Here, both of the first alignment treatment direction PD1 of the first alignment film AL1 and the second alignment treatment direction PD2 of the second alignment film AL2 are directions in parallel to the second direction Y and the same directions each other. At the time of OFF, the long axis of the liquid crystal molecule LM is initially aligned substantially in parallel to the first direction X. That is, the initial alignment direction of the liquid crystal molecule LM is in parallel to the first direction X, i.e., makes an angle of 0° with respect to the first direction X, in which the main pixel electrode PA and the main common electrode CA extend.

Figure 6:
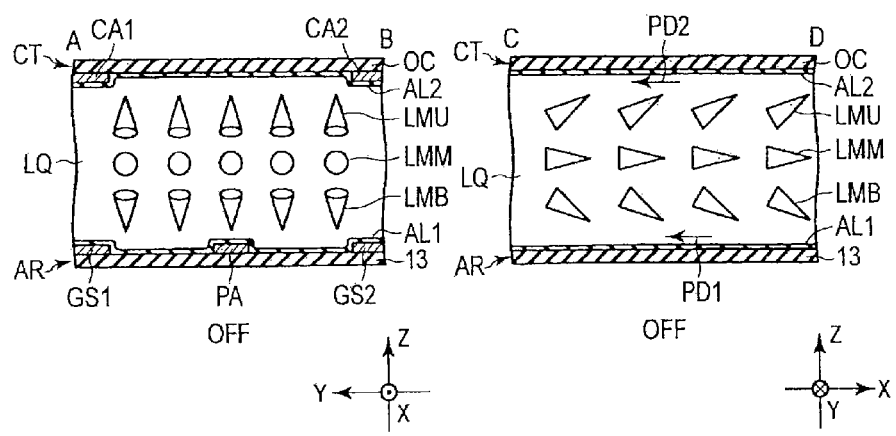
FIG. 6 is a figure schematically showing an alignment state of liquid crystal molecules in a liquid crystal layer at the time of OFF.

FIG. 6 is a figure schematically showing the alignment state of the liquid crystal molecule LM in the liquid crystal layer LQ at the time of OFF. In addition, although the liquid crystal molecule LM is generally in the shape of a rod or a rugby ball, herein, the liquid crystal molecule LM is illustrated by the shape of a cone. Each liquid crystal molecule LM has a conic bottom in one end portion, and a conical vertex in the other end portion. Moreover, the cross-sectional view taken along line A-B in the liquid crystal display panel LPN shown in FIG. 3A shows main elements among the structures shown in FIG. 4, that is, the main pixel electrode PA, the gate shield electrode GS1 and the gate shield electrode GS2 on the third insulating film 13 in the array substrate AR, and the main common electrode CA1 and the main common electrode CA2 on the overcoat layer OC on the counter substrate CT. Moreover, the cross-sectional view taken along line C-D in the liquid crystal display panel LPN shown in FIG. 3A shows main elements among the structures shown in FIG. 5.

In the cross-section of the liquid crystal layer LQ, the liquid crystal molecule LM, is aligned substantially in horizontal (pre-tilt angle is substantially zero) near the intermediate portion of the liquid crystal layer LQ. The liquid crystal molecule LM is aligned with a pre-tilt angle in which the alignment becomes symmetric with respect to the intermediate portion of the liquid crystal layer LQ in a portion near the array substrate AR (near the first alignment film AL1) and a portion near the counter substrate CT (near the second alignment film AL2). That is, the liquid crystal molecule LM is aligned in a splay alignment state.

In the cross-sectional view taken along line A-B, seen from the source line S1 side, i.e., on the ending side of the alignment treatment direction, the liquid crystal molecule LMM of the intermediate portion of the liquid crystal layer LQ is aligned so that the liquid crystal molecule LMM turns to the first direction X that is a normal direction of the figure, and the conic bottom turns to the front side. The liquid crystal molecule LMB of the liquid crystal layer LQ near the array substrate AR is aligned so that the conic bottom turns to the counter substrate CT side on the near side of the first direction X, and the conic vertex turns to the array substrate AR side on the far side of the first direction X. The liquid crystal molecule LMU of the liquid crystal layer LQ near the counter substrate CT is aligned so that the conic bottom turns to the array substrate AR side on the near side of the first direction X, and the conic vertex turns to the counter substrate CT side on the far side of the first direction X.

In the cross-sectional view taken along line C-D, which looks the region between the pixel electrode PA and the common electrode CA2 from the gate line G2 side, the liquid crystal molecule LMM of the intermediate portion of the liquid crystal layer LQ is aligned so that the conic bottom turns to the ending side of the alignment treatment direction (source line S1 side), and the conic vertex turns to the starting side of the alignment treatment direction (source line S2 side) substantially in parallel with the X-Y plane. The liquid crystal molecule LMB of the liquid crystal layer LQ near the array substrate AR is aligned so that the liquid crystal molecule LMB rises to the counter substrate CT side on the ending side of the first alignment treatment direction PD1, the conic vertex located on the starting side of the first alignment treatment direction PD1 turns to the array substrate AR side, and the conic bottom located on the ending side of the first alignment treatment direction PD1 turns to the counter substrate CT side. The liquid crystal molecule LMU of the liquid crystal layer LQ near the counter substrate CT is aligned so that the liquid crystal molecule LMU rises to the array substrate AR side on the ending side of the second alignment treatment direction PD2, the conic vertex located on the starting side of the second alignment treatment direction PD2 turns to the counter substrate CT side, and the conic bottom located on the ending side of the second alignment treatment direction PD2 turns to the array substrate AR side.

At the time of OFF, a portion of the backlight from the backlight 4 penetrates the first polarizing plate PL1, and enters into the liquid crystal display panel LPN. The light which entered into the liquid crystal display panel LPN is linearly polarized light which intersects perpendicularly with the first absorption axis AX1 of the first polarizing plate PL1. The polarization state of the linearly polarized light changes with the alignment state of the liquid crystal molecule LM when the linearly polarized light passes the liquid crystal layer LQ. However, at the time of OFF, the polarization state of the linearly polarized light which passes the liquid crystal layer LQ hardly changes. For this reason, the linearly polarized light which penetrates the liquid crystal display panel LPN is absorbed by the second polarizing plate PL2 which is arranged in Cross Nicol positional relationship with the first polarizing plate PL1 (black display).

The liquid crystal molecule LM near the first alignment film AM is initially aligned to the first alignment treatment direction PD1 by processing the first alignment film AM in the first alignment treatment direction PD1. Similarly, the liquid crystal molecule LM near the second alignment film AL2 is initially aligned to the second alignment treatment direction PD2 by processing the second alignment film AL2 in the second alignment treatment direction PD2. Further, in case the first alignment treatment direction PD1 is in parallel with and the same direction as the second alignment treatment direction PD2, the alignment state of the liquid crystal molecule LM of the liquid crystal layer LQ becomes the splay alignment state as mentioned above. The liquid crystal molecule LMB near the first alignment film AL1 and the liquid crystal molecule LMU near the second alignment film AL2 become symmetric with respect to the intermediate portion of the liquid crystal layer LQ on the upper and lower sides. For this reason, the visual angle inclining from the third direction Z, that is, the normal line direction of the substrate, is optically compensated by the liquid crystal molecule LMB and the liquid crystal molecule LMU. Therefore, when the first alignment treatment direction PD1 is in parallel with and the same as the second alignment treatment direction PD2, in a black display, there are few optical leaks. Thereby, a high contrast ratio can be realized, and it becomes possible to improve display grace.

On the other hand, in case potential difference (or electric field) is formed between the pixel electrode PE and the common electrode CE, i.e., at the time of ON, the lateral electric field (or oblique electric field) is formed in parallel with the substrates between the pixel electrode PE and the common electrode CE. The liquid crystal molecule LM is affected by the electric field between the pixel electrode PE and the common electrode CE, and the alignment state changes. More practically, while the liquid crystal molecule LM maintains the splay alignment state in the cross section of the liquid crystal molecule LQ, the liquid crystal molecule LM rotates in an acute angle direction with respect to the initial alignment direction in the X-Y plane.

In the example shown in FIG. 3A, the liquid crystal molecule LQ aligns symmetric with respect to the main pixel electrode PA on the both sides sandwiching the main pixel electrode PA in one pixel PX. In the region in the upper half of the pixel PX, i.e., the tramsmissive region between the main pixel electrode PA and the main common electrode CA1, the alignment state of the liquid crystal molecule LM mainly changes by the electric field between the main pixel electrode PA and the main common electrode CA1. In the X-Y plane, the liquid crystal molecule LM rotates clockwise to the first direction X, and aligns so that it may turn to the upper left in the figure. In the region in the lower half of the pixel PX, i.e., the tramsmissive region between the main pixel electrode PA and the main common electrode CA2, the alignment state of the liquid crystal molecule LM mainly changes by the electric field between the main pixel electrode PA and the main common electrode CA2. In the X-Y plane, the liquid crystal molecule LM rotates counterclockwise to the first direction X, and aligns so that it may turn to the lower left in the figure.

Thus, in each pixel PX, in case electric field is formed between the pixel electrode PE and the common electrode CE, the alignment direction of the liquid crystal molecule LM is divided into two or more directions by the position which overlaps with the pixel electrode PE, and domains are formed in each alignment direction. That is, two or more domains are formed in one pixel PX.

At the time of ON, a portion of the backlight which entered into the liquid crystal display panel LPN from the backlight 4 penetrates the first polarizing plate PL1, and enters into the liquid crystal display panel LPN. The light which entered into the liquid crystal display panel LPN is linearly polarized light which intersects perpendicularly with the first absorption-axis AX1 of the first polarizing plate PL1. When the linearly polarized light passes the liquid crystal layer LQ, the polarization state of the linearly polarized light changes in accordance with the alignment state of the liquid crystal molecule LM. For example, if the linearly polarized light in parallel to the first direction X enters into the liquid crystal display panel LPN in the X-Y plane, when passing the liquid crystal layer LQ, the light receives influence of phase difference by $\lambda/2$ by the liquid crystal molecule LM which is aligned in a 45°-225° direction or a 135°-315° direction with respect to the first direction X (herein, $\lambda$ is a wavelength of the light which penetrates the liquid crystal layer LQ). Thereby, the polarization state of the light which passes the liquid crystal layer LQ becomes linearly polarized light in parallel to the second direction Y. For this reason, at the time of ON, at least a portion of the light which passes the liquid crystal layer LQ penetrates the second polarizing plate PL2 (white display). However, in the position which overlaps with the pixel electrode or the common electrode, since the liquid crystal molecule maintains the initial alignment state, it becomes a black display like the time of OFF.

As mentioned above, in the structure according to this embodiment, the alignment direction of the liquid crystal molecule LM in one pixel is divided at least into two directions in the X-Y plane at the time of ON. The three-dimensional alignment state of the liquid crystal molecule LM in the liquid crystal layer LQ is mentioned later.

In order to realize the alignment state, it is necessary to provide the main common electrode CA1 and the main common electrode CA2 as the common electrode CE in addition to the pixel electrode PE having the main pixel electrode PA. That is, the gate shield electrode CS arranged on the array substrate AR is provided to shield electric field from other lines, to reinforce electric field required for the alignment control of the liquid crystal molecule LM, to form electric field required for the alignment control of the liquid crystal molecule LM in the adjoining pixels, or to make redundancy of the common electrode CE. Therefore, they are not indispensable to form the multi domains.

Figure 7:
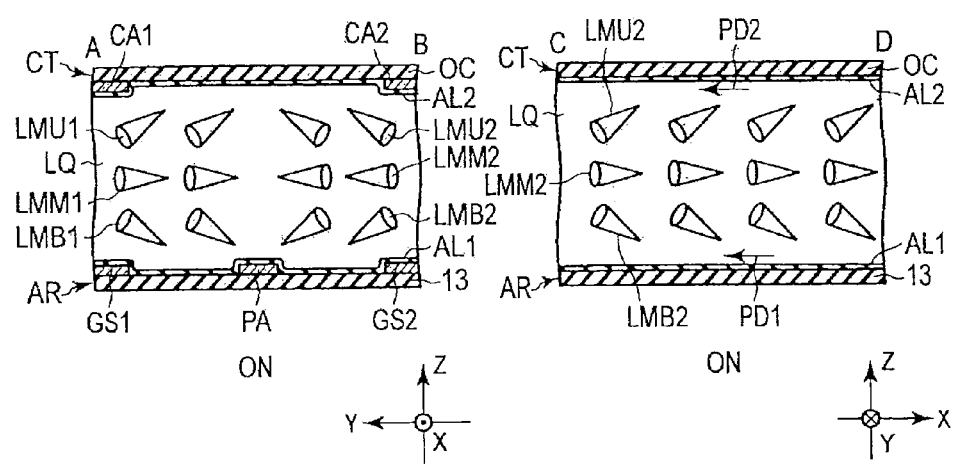

FIG. 7 is a figure schematically showing the alignment state of the liquid crystal molecule LM in the liquid crystal layer LQ at the time of ON. Also in the FIG. 7, the liquid crystal molecule LM is illustrated by the shape of a cone like FIG. 6. Moreover, only the principal portions are illustrated about the cross-sectional view taken along lines A-B and C-D.

In the cross-sectional view of the liquid crystal layer LQ, the alignment of the liquid crystal molecule LM still maintains the splay alignment state like the time of OFF.

In a cross-sectional view taken along line A-B, the liquid crystal molecule LM between the main pixel electrode PA and the main common electrode CA1 aligns so that the liquid crystal molecule LM turns from the main pixel electrode PA to the main common electrode CA1. The liquid crystal molecule LMM1 of the intermediate portion, the liquid crystal molecule LMB1 near the array substrate AR, the liquid crystal molecule LMU1 near the counter substrate CT of the liquid crystal layer LQ aligns so that the respective conic bottoms turn to the main common electrode CA1 side on the near side of the first direction X, that is, the normal line of the figure, and the conic vertex turns to the main pixel electrode PA on the far side of the first direction X. The liquid crystal molecule LMM1 of the liquid crystal layer LQ aligns in parallel with array substrate AR and the counter substrate CT. The liquid crystal molecule LMB1 of the liquid crystal layer LQ aligns so that the conic bottom rises to the counter substrate CT, i.e., the conic bottom turns to the main common electrode CA1. The liquid crystal molecule LMU1 of the liquid crystal layer LQ aligns so that the conic bottom rises to the array substrate AR, i.e., the conic bottom turns to the shield electrode GS1. The alignment states of the liquid crystal molecules LMM1, the liquid crystal molecule LMB1, and the liquid crystal molecule LMU1 maintain the splay alignment state.

In the cross-sectional view taken along line A-B, the liquid crystal molecule LM between the main pixel electrode PA and the main common electrode CA2 aligns so that the liquid crystal molecule LM turns from the main pixel electrode PA to the main common electrode CA2. The liquid crystal molecule LMM2 of the intermediate portion, the liquid crystal molecule LMB2 near the array substrate AR, and the liquid crystal molecule LMU2 near the counter substrate CT of the liquid crystal layer LQ align so that the respective conic bottoms turn to the first main common electrode CA2 side on the near side of the first direction X, and the conic vertex turns to the main pixel electrode PA on the far side of the first direction X. The liquid crystal molecule LMM2 of the liquid crystal layer LQ aligns in parallel with the array substrate AR and the counter substrate CT. The liquid crystal molecule LMB2 of the liquid crystal layer LQ aligns so that the conic bottom rises to the counter substrate CT, i.e., the conic bottom turns to the main common electrode CA2. The liquid crystal molecule LMU2 of the liquid crystal layer LQ aligns so that the conic bottom rises to the array substrate AR, i.e., the conic bottom turns to the shield electrode GS2. The alignment states of the liquid crystal molecules LMM2, the liquid crystal molecule LMB2, and the liquid crystal molecule LMU2 maintain the splay alignment state.

In the cross-sectional view taken along line C-D, which looks at the region between the main pixel electrode PA and the main common electrode CA2 from the gate line G2, the liquid crystal molecule LMM2 of the intermediate portion, the liquid crystal molecule LMB2 near the array substrate AR, and the liquid crystal molecule LMU2 near the counter substrate CT align so that the respective conic bottoms on the ending side of the alignment treatment direction are located on the near side of the second direction Y, that is the normal line of the figure, and the conic vertex on the starting side of the alignment treatment direction is located on the far side of the second direction Y. The liquid crystal molecule LMM2 aligns in parallel with the X-Y plane. The liquid crystal molecule LMB2 aligns so that the conic bottom located on the ending side of the first alignment treatment direction PD1 turns to the counter substrate CT side and is located on the near side of the second direction Y. The conic vertex located on the starting side of the first alignment treatment direction PD1 turns to the array substrate AR side and is located on the far side of the second direction Y. The liquid crystal molecule LMU2 near the counter substrate CT is aligned so that the conic bottom located on the ending side of the second alignment treatment direction PD2 turns to the array substrate AR side and is located on the near side of the second direction Y. The conic vertex located on the starting side of the second alignment treatment direction PD2 turns to the counter substrate CT side and is located on the far side of the second direction Y.

Thus, the liquid crystal molecule LMU1, the liquid crystal molecule LMB1, the liquid crystal molecule LMU2, and the liquid crystal molecule LMB2 align in different directions, respectively, in the three-dimensional space of the liquid crystal layer LQ, at the time of ON. Therefore, it becomes possible to form substantially four domains in one pixel by the respective liquid crystal molecules. Even at the time ON, in the visual angle direction inclined from the third direction Z, the display is compensated by the combination of the liquid crystal molecule LMU1 and the liquid crystal molecule LMB1, and the combination of the liquid crystal molecule LMU2 and the liquid crystal molecule LMB2. Therefore, the visual angle capable obtaining high transmissivity can be expanded without generating of gradation inversion, and wide viewing angle is attained.

Moreover, since high transmissivity is obtained in the electrode gap between the pixel electrode PE and the common electrode CE according to this embodiment, it becomes possible to correspond by expanding the inter-electrode distance between the pixel electrode PE and the main common electrode CA in order to make transmissivity of each pixel high enough.

Moreover, in the display device with high resolution, the second pitch between the source lines S in one pixel PX becomes narrow. If the distance between the main pixel electrode PA and the main common electrode CA are arranged in parallel to the source lines S, there is a possibility that inter-electrode distance between the main pixel electrode PA and the main common electrode CA cannot be fully taken. On the other hand, the first pitch is larger than the second pitch. If the main pixel electrode PA and the main common electrode CA are arranged in parallel with the gate line G, it becomes possible to take the inter-electrode distance between the main pixel electrode PA and the main common electrode CA sufficiently even in a high resolution display specification in which the second pitch is small.

Here, the relation between the first pitch and the second pitch of one pixel is described below. One unit (picture element) is constituted by the minimum number of adjoining pixels among the pixels which correspond to R (red), G (green), B (blue) of the color filter, respectively. The pixel pitch is designed so that the picture element may become an approximately square. That is, if one picture element is formed of three pixels having color filters, respectively, extending in the first direction X, the first pitch between the gate lines is larger than the second pitch between the source lines in one pixel. That is, the first pitch is larger substantially three times than the second pitch. Considering the relationship between the first pitch and the second pitch, the main common electrode CA is arranged in parallel to the gate line so that the inter-electrode distance between the main common electrode CA1 and main common electrode CA2 may become substantially equal to the first pitch. Further, the main pixel electrode PA is arranged between the two main common electrodes CA (preferably, in the center between the two main common electrodes CA). Thereby, it becomes possible to secure the inter-electrode distance which can maintain high transmissivity. That is, the transmissive region contributing the display is formed using the distance of the long end of the pixel PX. Therefore, it becomes possible to secure sufficient distance between the electrodes by arranging the main pixel electrode PA and the main common electrode CA in parallel to the short end of the pixel PX. Even in the display device of high resolution in which the second pitch becomes small, it becomes possible to make transmissivity high enough in one pixel. Further, it becomes possible to obtain a wide viewing angle by the multi-domain structure.

In addition, although the color filters of three primary colors RGB are arranged in the first direction X according to this embodiment, the above technique is applicable to the color filter of four-primary colors, such as R (red), G (green), B (blue), and Y (yellow) or more primary colors. In the four primary colors (R, G, B,Y), that is, the tranmissive region contributing the display is formed using the distance of the long end of the pixel PX like the case of the three-primary colors (R,G,B). The same effect is obtained by arranging the main pixel electrode PA and the main common electrode CA in parallel to the short end of the pixel PX.

Moreover, in case the distance between the source lines is larger than that between the gate lines in the pixel, that is, in case the long end of the pixel PX is an end in parallel to the gate line G and the short end of pixel PX is an end in parallel to the source line S, the main pixel electrode PA and the main common electrode CA are arranged in parallel to the source line S so that the second pitch between the source lines can be used. Practically, the main common electrodes CA are arranged in parallel to the source line so that the distance between the two main common electrodes CA may become equal to the second pitch between the source lines S. That is, the two main common electrodes CA are arranged so that they may locate above the source line S, respectively. It is preferable that the main pixel electrode PA is arranged substantially in the center portion of the pixel PX, that is, the main pixel electrode PA is arranged so that the distances between the main pixel electrode PA and the each of the main common electrodes CA are substantially the same. Thereby, the same effect as the above is obtained.

In addition, the above arrangement of the main common electrode CA and the main pixel electrode PA may be changed. That is, in one pixel PX, two main pixel electrodes PA are arranged near a pair of short ends of the pixel PX, respectively, and one main common electrode CA is arranged between the two main pixel electrodes PA.

In the display devices in which the pixel pitch is different, respectively, a peak condition of a transmissivity distribution can be used by changing the electrode gap between the pixel electrode PE and the common electrode CE according to this embodiment. That is, in the display mode according to this embodiment, it becomes possible to offer the display panel having various pixel pitches by setting up inter-electrode distance without necessarily using microscopic processing corresponding to the product specification from low resolution with a comparatively large pixel pitch to high resolution with a comparatively small pixel pitch. Therefore, it becomes possible to realize the demand for high transmissivity and high resolution easily.

According to this embodiment, the transmissivity falls sufficiently in the region in which the liquid crystal molecules overlap with the black matrix layer This is because the leak of electric field does not occur outside of the pixel from the common electrode CE, and undesired lateral electric field is not produced between the adjoining pixels on the both sides of the black matrix BM. That is, it is because the liquid crystal molecule of the region which overlaps with the black matrix BM maintains the initial alignment state like at the time OFF (or the time of a black display). Furthermore, it is because that while the common electrode CE is not arranged on the source line S, the leaked light between the source line S and the pixel electrode PE is formed in a direction in parallel with the first direction that is the initial alignment direction of the liquid crystal molecule LM, and the liquid crystal molecule LM in the circumference maintains the initial alignment state. Accordingly, even in case the color of the color filter layers CF of the adjoining pixels is different, it becomes possible to suppress the mixed color, and also the reduction of the contrast rate.

Moreover, when an assembling shift occurs between the array substrate AR and the counter substrate CT, a difference may arises in distances between the respective common electrodes CE of the both sides of the pixel and the pixel electrode PE. However, the alignment shift is produced in common to all the pixels PX, there is no difference in the electric field distribution between the pixels PX, and the influence to the display of the image is negligible. Even if the assembling shift arises between the array substrate AR and the counter substrate CT, it becomes possible to control the undesirable electric field leak to the adjoining pixels. For this reason, even if it is in a case where the color of the color filter differs between the adjoining pixels, it becomes possible to control the generation of the mixed colors, and also becomes possible to suppress the falls of color reproducibility nature and the contrast ratio.

According to this embodiment, the main common electrode CA counters with the gate line G. When the main common electrode CA1 and the main common electrode CA2 are especially arranged on the gate line G1 and the gate line G2, respectively, the aperture portion AP which contributes to the display can be expanded as compared with the case where the main common electrode CA1 and the main common electrode CA2 are arranged on the pixel electrode PA side rather than above the gate line G1 and the gate line G2, and it becomes possible to improve the transmissivity of the pixel PX.

Moreover, it becomes possible to expand the distances between the main pixel electrode PE and the main common electrode CA1, and between the main pixel electrode PE and the main common electrode CA2 by arranging each of the main common electrodes CA1 and the main common electrode CA2 above the gate line G1 and the gate line G2, respectively, and also becomes possible to form more horizontal electric field closer to the horizontal direction. Further, it becomes possible to set the distance between the main pixel electrode PE and the common electrode CE large enough against the variation of the distance between the electrodes due to the assembling shift. Accordingly, the illumination variation can be reduced due to the assembling shift.

According to this embodiment, the array substrate AR includes the gate shield electrode GS located in the both sides sandwiching the pixel electrode PE. Since the gate shield electrode GS counters with the gate line G, it becomes possible to shield undesirable electric field from the gate line G. For this reason, it can be controlled that undesirable bias is impressed from the gate line G to the liquid crystal layer LQ, and it also becomes possible to suppress the generating of defect display such as the printing picture and the optical leak resulting from the alignment defect of the liquid crystal molecule.

Furthermore, at the time of ON, since horizontal electric field is hardly formed (or sufficient electric field to drive the liquid crystal molecule LM is not formed) on the main pixel electrode PE or the common electrode CE, the liquid crystal molecule LM hardly moves from the initial alignment direction like at the time of OFF. For this reason, as mentionedabove, even if the pixel electrode PE and the common electrode CE are formed of the electric conductive material with the light transmissive characteristics in these domains, backlight hardly penetrates, and hardly contributes to the display at the time of ON. Therefore, the pixel electrode PE and the common electrode CE do not necessarily need to be formed of a transparent electric conductive material, and may be formed using non-transparent electric conductive materials, such as aluminum (Al), titanium (Ti), silver (Ag), molybdenum (Mo), tungsten (W), and chromium (Cr).

When at least one of the pixel electrode PE and the common electrode CE is formed of the above-mentioned opaque electric conductive material, the linearly polarized light which entered into the liquid crystal display panel LPN is in parallel with or intersects perpendicularly the extending direction of the edge of the pixel electrode PE or the common electrode CE. Moreover, the extending direction of the gate line G, the auxiliary capacitance line C, and the source line S, respectively, formed of the above opaque electric conductive materials is substantially in parallel with or intersects perpendicularly the linearly polarized light. For this reason, in the reflected light by the edge of the pixel electrode PE, the common electrode CE, the gate line G, the auxiliary capacitance line C, and the source line S, the polarized face is not disturbed easily, and the polarized face can be maintained in the state where the linearly polarized light passed the first polarizing plate PL1. Therefore, since the linearly polarized light which penetrated the liquid crystal display panel LPN at the time of OFF is fully absorbed by second polarizing plate PL2 which is a polarizer, it becomes possible to control optical leak. That is, transmissivity can be fully reduced in the case of a black display, and it becomes possible to control the fall of a contrast ratio. Moreover, it is not necessary to make the width of the black matrix BM large for the measure against the optical leak in the circumference of the pixel electrode PE or the common electrode CE. Accordingly, it becomes possible to control reduction of the area of the aperture portion AP and decrease of the transmissivity at the time of ON Moreover, although the case where the liquid crystal layer LQ is constituted by the liquid crystal material having positive dielectric anisotropy (positive type) is explained, the liquid crystal layer LQ may be constituted by liquid crystal material having negative dielectric anisotropy (negative type).

In addition, in this embodiment, the structure of the pixel PX is not limited to the above-mentioned example. Hereinafter, variations of the pixel structure in this embodiment are explained briefly, referring to FIGS. 8A, 8B, 8C, FIGS. 9A, 9B, and FIGS. 10A, 10B, 10C, 10D. In addition, in each figure, the liquid crystal molecule LMB near the array substrate AR is illustrated. While the conic bottom is located in the ending side of the first alignment direction PD1 and rises in the normal direction of the figure, the conic vertex is located in the starting side of the first alignment direction PD1. Moreover, in each figure, both the main pixel electrode PA and the main common electrode CA are illustrated by being simplified. The illustration of the source line, the gate line, the auxiliary capacitance line, the switching element, etc., is omitted. The domain enclosed with a dashed line in the figure corresponds to the pixel PX.

Figure 8A:
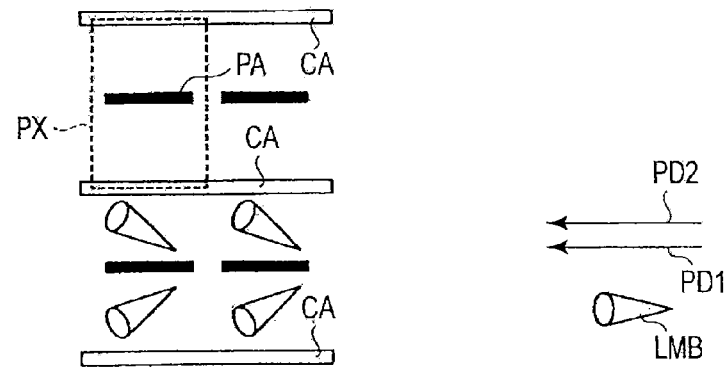
FIGS. 8A, 8B and 8C are figures showing variations of the pixel structures according to the embodiment.

FIG. 8A corresponds to the structure according to this embodiment shown referring FIG. 2 to FIG. 7.

Figure 8B:
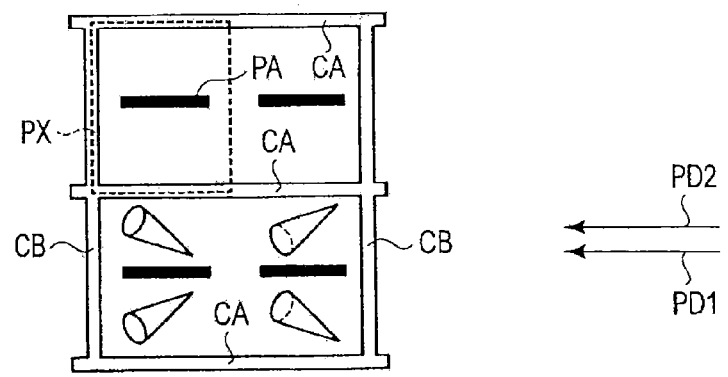
Figure 8C:
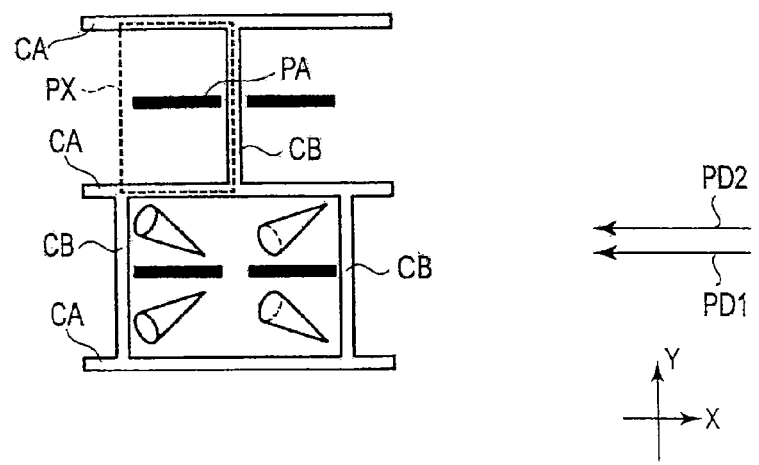

The structures shown in FIG. 8B and FIG. 8C are different from that shown in FIG. 8A in that a sub-common electrode CB extending in the second direction Y is provided in addition to the main common electrode CA. The sub-common electrode CB is located on the source line S which is not illustrated, and arranged either on the array substrate AR or the counter substrate CT.

In the structure shown in FIG. 8B, the sub-common electrode CB linearly extends in the second direction Y and is arranged only on the same side of the pixel adjoining in the second direction Y, that is, only the right side or only the left side of the pixel PX. In a pair of adjoining pixels PX in the X direction, the sub-common electrode CB in one pixel is arranged on the right-hand side of the pixel, and the sub-common CB in the other end pixel is arranged on the left-hand side of the pixel.

Although the spray alignment is carried out in each pixel at the time of ON and OFF, the alignment state of the liquid crystal molecule LMB is different in respective pixels PX in which the sub-common electrode CB is arranged only on the left-hand side, and pixel PX in which the sub-common electrode CB is arranged only on the right-hand side. That is, in the pixel in which the sub-common electrode CB is arranged only on the left-hand side, while the liquid crystal molecule LMB rotates clockwise in the domain of the upper portion in the pixel PX, the liquid crystal molecule LMB rotates counterclockwise in the domain of the lower portion. In the pixel in which the sub-common electrode CB is arranged only on the right-hand side, while the liquid crystal molecule LMB rotates counterclockwise in the domain of the upper portion in the pixel PX, the conic bottom turns to the array substrate AR side, and a conic vertex turns to the counter substrate CT side. On the other hand, in the domain of the lower portion in the pixel PX, while the liquid crystal molecule LMB rotates clockwise, the conic bottom turns to the counter substrate CT side, and a conic vertex turns to the array substrate AR side.

In the structure shown in FIG. 8C, the sub-common electrode CB is arranged only on the right-hand side of one of the pixels adjoining in the second direction Y, and arranged only on the left-hand side in the other pixel. In a pair of adjoining pixels PX in the X direction, the sub-common electrode CB of one pixel is arranged on the right-hand side of the pixel, and the sub-common electrode CB of the other pixel is arranged on the left-hand side of the pixel. Since the alignment state of the liquid crystal molecule in the above structure is the same as that shown in FIG. 8B, the explanation is omitted.

The structures shown in FIG. 9A and FIG. 9B are different from that shown in FIG. 8A in that a sub-pixel electrode PB extending in the second direction Y is provided in addition to the main pixel electrode PA. The sub-pixel electrode PB is connected with one end of the main pixel electrode PA, and forms the pixel electrode of a T shape with the main pixel electrode PA. In the illustrated example, the sub-pixel electrode PB is connected with the right-hand end of the main pixel electrode PA in all the pixels PX. That is, the pixel electrodes PE of all the pixels PX turn to the same direction.

The structure shown in FIG. 9A includes only the common electrode CA as the common electrode, and the structure shown in FIG. 9B includes the sub-common electrode CB in addition to the common electrode CA. The sub-common electrode CB shown in FIG. 9B linearly extends in the second direction Y, and arranged on the both sides of each pixel. That is, the sub-common electrode CB is arranged between the sub-pixel electrode PB of one pixel and the main pixel electrode PA of the other pixel. The alignment state of the liquid crystal molecule is the same as that of the structure shown in FIG. 8A.

The structures shown in FIGS. 10A, 10B, 10C and 10D adopt the T shape pixel electrode PE like the structure shown in FIG. 9A and FIG. 9B. In the example shown in the figure, the directions of the respective electrodes PE of the adjoining pixels in the first direction X is different each other.

In FIGS. 10A and 10B, the pixel electrode PE of each pixel PX which adjoins in the second direction Y turns to the same direction altogether. In the pixel electrode PE of each pixel PX which adjoins in the first direction X, each sub-pixel electrode PB faces each other. In the pixel electrode PE of each pixel PX which adjoins in the second direction Y, each sub-pixel electrode PB is located on the same straight line along the second direction Y. In addition, in the example shown in FIG. 10A, the pixel has only the main common electrode CA as the common electrode. In the example shown in FIG. 10B, the pixel has the sub-common electrode CB as the common electrode in addition to the main common electrode CA. The sub-common electrode CB shown in FIG. 10B linearly extends in the second direction Y, and is arranged at the opposite side in which the sub-pixel electrode PB of each pixel PX is arranged. For example, in the pixel PX on the left-hand side shown in FIG. 10B, while the sub-common electrode CB is connected with the main pixel electrode PA on the right-hand side, the sub-common electrode CB is arranged on the left-hand side of the pixel. Similarly, in the pixel PX on the right-hand side shown in FIG. 10B, while the sub-pixel electrode PB is connected with the main pixel electrode PA on the left-hand side, the sub-common electrode CB is arranged on the right-hand side of the pixel PX.

In FIGS. 10C and 10D, the direction of the pixel electrode PE of each pixel PX which adjoins in the second direction Y is different each other. In the pixel electrode PE of each pixel PX which adjoins in the first direction X in the upper row, each main pixel electrode PA faces each other. In the pixel electrode PE of each pixel PX which adjoins in the first direction X in the lower row, each main pixel electrode PB faces each other. In addition, in the structure shown in FIG. 10C, the pixel has only the main common electrode CA as a common electrode. The pixel shown in FIG. 10D includes the sub-common electrode CB in addition to the main common electrode CA. The sub-common electrode CB shown in FIG. 10D is arranged at the opposite side to the side in which the sub-pixel electrode PB of each pixel PX is arranged. For example, in the pixel PX on the left-hand side in the upper row shown in FIG. 10D, while the sub-pixel electrode PB is connected with the main pixel electrode PA on the left-handside, the sub-common electrode CB is arranged on the right-hand side of the pixel PX. In the pixel PX on the right-hand side in the upper row, while the sub-pixel electrode PB is connected with the main pixel electrode PA on the right-hand side, the sub-common electrode CB is arranged on the left-hand side of the pixel PX. In the pixel PX on the left-hand side in the lower row shown in FIG. 10D, while the sub-pixel electrode PB is connected with the main pixel electrode PA on the right-hand side, the sub-common electrode CB is arranged on the left-hand side of the pixel PX. In the pixel PX on the right-hand side in the lower row, while the sub-pixel electrode PB is connected with the main pixel electrode PA on the left-hand side, the sub-common electrode CB is arranged on the right-hand side of the pixel PX.

Each alignment state of the liquid crystal molecule in the above variations are substantially the same, and the above-mentioned effect is acquired.

In the above examples, a first electrode corresponds to the pixel electrode PE (main pixel electrode PA), and a second electrode corresponds to the common electrode CA. However, the first electrode may be exchanged by the second electrode. In this case, the first electrode corresponds to the common electrode CA, and the second electrode corresponds to the pixel electrode PE (main pixel electrode CA).

As explained above, according to the embodiments, it becomes possible to offer the liquid crystal display device which can control degradation of display grace.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
a first substrate including:
a gate line and an auxiliary capacitance line extending in a first direction,
a source line extending in a second direction orthogonally crossing the first direction,
a switching element electrically connected with the gate line and the source line,
a pixel electrode having a main pixel electrode arranged on the auxiliary capacitance line and extending in the first direction, the pixel electrode being connected with the switching element,
a common electrode having a main common electrode arranged on the gate line and extending in the first direction, and
a first alignment film covering the pixel electrode and the common electrode;
a second substrate including:
a second alignment film; and
a liquid crystal layer held between the first substrate and the second substrate having liquid crystal molecules, the liquid crystal molecule being initially aligned in parallel with the first substrate and the second substrate in a state where electric field is not formed between the pixel electrode and the common electrode.

2. The liquid crystal display device according to claim 1, wherein the pixel electrode is formed in a pixel in which the length along the first direction is shorter than that along the second direction.

3. The liquid crystal display device according to claim 1, wherein the switching element is formed in a region which overlaps with the source line and the auxiliary capacitance line.

4. The liquid crystal display device according to claim 1, wherein the first substrate includes a sub-pixel electrode connected with one end of the main pixel electrode and extending in the second direction.

5. The liquid crystal display device according to claim 4, wherein the pixel electrode is formed in a T-shape.

6. A liquid crystal display device, comprising:
a first substrate including:
a first gate line and a second gate line extending in a first direction, respectively, and arranged in a second direction orthogonally crossing the first direction with a first pitch,
a first source line and a second source line extending in the second direction, respectively, and arranged in the first direction with a second pitch smaller than the first pitch,
a first electrode arranged substantially in the center portion between the first gate line and the second gate line and extending in the first direction,
a second electrode arranged on the first and second gate lines, respectively, and extending in the first direction, and
a first alignment film covering the first electrode and the second electrode;
a second substrate including a second alignment film;
a liquid crystal layer held between the first substrate and the second substrate and having liquid crystal molecules, wherein the liquid crystal molecules are initially aligned in parallel with the first substrate and the second substrate in a state where electric field is not formed between the first electrode and the second electrode.

7. The liquid crystal display device according to claim 6, wherein the first electrode is formed of a pixel electrode and the second electrode is formed of a common electrode.

8. The liquid crystal display device according to claim 6, comprising a picture element formed of a plurality of pixels displaying different colors, wherein the length of the picture element along the first direction is substantially the same as that along the second direction.

9. The liquid crystal display device according to claim 6, wherein
the first substrate includes an auxiliary capacitance line arranged between the first gate line and the second gate line and extending in the first direction, and a switching element connected with the first gate line and the first source line and arranged in a region which overlaps with the first source line and the auxiliary capacitance line, and
the first electrode is arranged on the auxiliary capacitance line and electrically connected with the switching element.

10. A liquid crystal display device, comprising:
a first substrate including:
a pixel electrode having a main pixel electrode extending in a first direction arranged in a pixel in which the length along the first direction is shorter than that along a second direction orthogonally crossing the first direction,
a common electrode having a main common electrode extending in the first direction on both sides sandwiching the main pixel electrode, and
a first alignment film covering the pixel electrode and the common electrode;
a second substrate including:
a second alignment film; and
a liquid crystal layer held between the first substrate and the second substrate having liquid crystal molecules.

11. The liquid crystal display device according to claim 10, wherein
the pixel is formed in a rectangular shape having a pair of short ends along the first direction and a pair of long ends along the second direction, and
the common electrode is arranged on the pair of short ends, and the main pixel electrode is arranged substantially in a center portion of the pixel apart from the pair of the short ends with equal distance.

12. The liquid crystal display device according to claim 10, wherein the first substrate includes an auxiliary capacitance line under the main pixel electrode and extending in the first direction, a gate line arranged under the main common electrode and extending in the first direction, a source line extending in the second direction, and a switching element connected with the gate line and the source line and arranged in a region which overlaps with the source line and the auxiliary capacitance line.

13. The liquid crystal display device according to claim 10, comprising a picture element formed of a plurality of pixels for displaying different colors, wherein the length of the picture element along the first direction is substantially the same as that of the second direction.

14. A liquid crystal display device, comprising:
a first substrate including a main pixel electrode formed in the shape of a belt extending linearly, and a main common electrode arranged on both sides sandwiching the main pixel electrode and extending substantially in parallel with the direction in which the main pixel electrode extends;

a second substrate; and a liquid crystal layer held between the first substrate and the second substrate having liquid crystal molecules, wherein the liquid crystal molecules are initially aligned along an initial alignment direction substantially in parallel with the extending direction of the main pixel electrode the first substrate and the second substrate at the time when the electric field is not formed between the main pixel electrode and the main common electrode, and at the time when electric field is formed between the main pixel electrode and the main common electrode, the liquid crystal molecules rotate to an acute angle direction with respect to the initial alignment direction in a parallel plane with the substrate.

15. The liquid crystal display device according to claim 14, wherein the liquid crystal molecules are aligned symmetric with respect to the main pixel electrode on both sides sandwiching the main pixel electrode when electric field is formed between the main pixel electrode and the main common electrode.

16. The liquid crystal display device according to claim 14, wherein the liquid crystal molecules in one of both regions sandwiching the main pixel electrode rotate clockwise to the initial alignment direction, and the liquid crystal molecules in the other of the both regions sandwiching the main pixel electrode rotate counterclockwise to the initial alignment direction when electric field is formed between the main pixel electrode and the main common electrode.

17. A liquid crystal display device, comprising:

a first substrate including:
- a gate line extending in a first direction,
- a first source line and a second source line extending in a second direction orthogonally crossing the first direction, respectively,
- a pixel electrode arranged substantially in a center portion of a pixel and extending in the first direction,
- a common electrode arranged in an end of the pixel extending in the first direction, and
- a first alignment film covering the pixel electrode and the common electrode;

a second substrate including a second alignment film, a liquid crystal layer held between the first substrate and the second substrate and having liquid crystal molecules, wherein the liquid crystal molecules are initially aligned in parallel with the first substrate and the second substrate in a state where electric field is not formed between the pixel electrode and the common electrode.

\* \* \* \* \*